US012623394B2

(12) United States Patent
Feuilloley et al.

(10) Patent No.: US 12,623,394 B2
(45) Date of Patent: May 12, 2026

(54) PREFORM AND CONTAINER WITH VARIABLE TRANSMITTANCES

(71) Applicant: SIDEL PARTICIPATIONS, Octeville-sur-Mer (FR)

(72) Inventors: Guy Feuilloley, Octeville-sur-Mer (FR); Naïma Boutroy, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/237,651

(22) Filed: Apr. 22, 2021

(65) Prior Publication Data

US 2022/0204230 A1 Jun. 30, 2022

(30) Foreign Application Priority Data

Apr. 22, 2020 (FR) ...................................... 2003996

(51) Int. Cl.
| | |
|---|---|
| *B29C 49/00* | (2006.01) |
| *B29L 31/00* | (2006.01) |
| *B65D 1/02* | (2006.01) |
| *B65D 65/38* | (2006.01) |

(52) U.S. Cl.
CPC ........ *B29C 49/0005* (2013.01); *B29C 49/071* (2022.05); *B65D 1/0207* (2013.01); *B65D 65/38* (2013.01); *B29K 2995/0018* (2013.01); *B29K 2995/0027* (2013.01); *B29L 2031/7158* (2013.01)

(58) Field of Classification Search
CPC .................................................. B29C 49/071
See application file for complete search history.

(56) References Cited

U.S. PATENT DOCUMENTS 5,976,653 A * 11/1999 Collette .................. B32B 27/36
264/513

FOREIGN PATENT DOCUMENTS

| | | | |
|---|---|---|---|
| EP | 2125316 | A1 | 12/2009 |
| JP | 1994191589 | A | 7/1994 |
| JP | 2018134838 | A | 8/2018 |
| JP | 2018202629 | A | 12/2018 |
| WO | 2006056673 | A1 | 6/2006 |
| WO | 2017095931 | A1 | 6/2017 |
| WO | 2019133713 | A1 | 7/2019 |
| WO | WO2019133713 | * | 7/2019 |

OTHER PUBLICATIONS

French Search Report dated Dec. 8, 2020.

* cited by examiner

*Primary Examiner* — Michael C Miggins
(74) *Attorney, Agent, or Firm* — Blake T. Hudson; Stephanie L. Davy-Jow

(57) ABSTRACT

The invention relates to a preform intended for forming containers by blow molding or stretch-blow molding, the preform being made of plastic material including at least one additive giving the plastic material the property of at least partially filtering the visible light spectrum, the preform comprising a wall forming a hollow body, said one or more additive(s) giving the plastic material the property of at least partially allowing the passage of light in the infrared spectrum.

22 Claims, 2 Drawing Sheets

[Fig.1]

PREFORM AND CONTAINER WITH VARIABLE TRANSMITTANCES

FIELD OF INVENTION

The field of the invention is that of the design and the manufacture of plastic containers. More specifically, the invention relates to the manufacture of containers intended to contain products that must be protected from light and that are manufactured by blow molding or stretch-blow molding a preform.

BACKGROUND

Conventionally, a preform comprises a hollow body, generally rotationally cylindrical, a neck that has a lip, and a base that closes the body opposite the neck.

In order to produce a preform, a plastic material forming the preform is injected into an injection mold in the fluid state and at a high pressure.

A conventional technique for manufacturing a container from a preform involves heating the preform inside an oven, then forming the container in a blowing mold, which will simply be called "mold".

Forming the container involves introducing the heated preform into the mold, which has a wall defining a cavity with the impression of the container, and in injecting a fluid into the preform, via a pipe, which fluid is a fluid such as a pressurized gas or a liquid for pressing the material of the preform against the wall of the mold.

In order to correctly heat the preforms, they need to be heated within a process temperature range that is greater than the glass transition temperature of the material (approximately 70 degrees Celsius in the case of PET), yet nevertheless that is less than the spherulitic crystallization temperature of this material and much less than the melting temperature.

In the industry, ovens are conventionally used that are equipped with halogen lamps, which are particularly powerful and radiate over the entire light spectrum.

This type of oven has low efficiency with respect to the power output compared to the actual heating of the preform.

Indeed, a material such as PET is particularly insulating, and variably absorbs electromagnetic radiation emitted in the infrared spectrum. Furthermore, a preform can have a wall that can be up to 5 mm thick. Consequently, following a given heating operation, a temperature difference can be observed between the outer skin and the inner skin of the wall of the body of the preform.

This temperature difference is compensated by the presence of forced ventilation in the ovens. This ventilation allows the outer skin to be cooled in order to prevent it from reaching the spherulitic crystallization temperature, whereas the heat is diffused in the thickness of the wall of the body of the preform.

Ovens also exist that are equipped with laser diodes. This technology aims to improve the output of the ovens, whilst allowing the time for heating a preform to be reduced.

The laser heating technique is particularly described in the international application published under number WO 2006/056673, and an improvement of this technique is described in the European patent published under number EP 2125316.

Within a unit for manufacturing containers, and based on basic preforms, for example, which are intended to be used to form transparent containers intended to contain water, it is possible to obtain production rates of 2500 to 2700 bottles per hour and per mold.

Depending on the destination of the containers, said containers must have precise features that can be obtained by virtue of the design of the preforms.

More specifically, some products contained in containers can be altered under the effect of light. This is particularly the case for milk, the taste of which changes under the effect of light.

This altered taste develops into two sensations:

an "activated" taste (cabbage taste, cooked taste or mushroom taste) that occurs very quickly;

an oxidation taste (taste of cardboard, paper, metal, oil) that develops more slowly.

With respect to milk, it is particularly known that light, within the wavelength range of 350 nm to 520 nm, causes riboflavin degradation, which is one of the causes of the "activated" taste.

In order to allow milk to be preserved in plastic containers, for a relatively long duration and whilst avoiding the alteration described above, plastic containers are conventionally used that have the ability of preventing light from passing through the wall thereof.

These containers, which are often white, are obtained from preforms made of plastic material including one or more additives intended to create this "light barrier" capability.

According to a well known example, for milk products, bottles are produced from preforms made of PET resin with added titanium dioxide ($TiO_2$). The titanium dioxide provides the white color and the light barrier functionality in the visible spectrum and allows the riboflavin (vitamin B2) degradation to be prevented.

For other applications of bottles, titanium dioxide is also added to obtain visual, non-functional opacity.

This type of additive nevertheless has a negative impact on the actual manufacture of the containers.

Indeed, these additives, in addition to having a "light barrier" effect, also give the container an ability to block electromagnetic radiation in the infrared field.

For this reason, the radiation produced in the heating ovens intended to heat the preforms cannot efficiently heat said preforms.

More specifically, these preforms then have basically zero transmittance in relation to electromagnetic radiation in the visible and infrared fields. Incident infrared radiation penetrates a very limited thickness of the material containing such a light barrier and is basically reflected. For this reason, the absorbance to this radiation is particularly high on the outer skin of the preforms.

During heating, this leads to a significant increase in the temperature of the outer skin of the preforms, which skin is directly exposed to the radiation, whereas the inner skin is heated, not directly, but only, or basically, by thermal conduction, which slowly diffuses the temperature through the wall of the preforms from the outer skin.

A negative consequence resides in the fact that this heating risks causing the process temperature range to be exceeded, which can reach the melting point, on the outer skin, whereas the inner skin still has not reached the glass transition temperature, degrading the appearance (in particular bubbling) and the structural features of the preform.

Therefore, such preforms must be heated in a specific manner, i.e. for example, the heating time must be increased, or the production rates of the bottles must be reduced.

For this type of preform, called opaque preforms, this leads to a reduction in the production rates compared to the production rates of preforms called clear preforms. By way of an example, for opaque preforms with a wall thickness of more than 2.5 mm, the rates of the machines can only reach 1800 bottles per hour per mold.

It is also possible to note that in halogen ovens, the forced ventilation is adjusted to its maximum level to allow the outer skin of the opaque preforms to be cooled, which causes increased energy expenditure.

With respect to laser heating, which has a short heating time and which, as described in the aforementioned inventions of the applicant, does not comprise a system for ventilating the body of the preform inside ovens, it is impossible to heat this type of opaque preform with this technology.

Indeed, the heating radiation of the laser ovens is mainly reflected by the PET preforms, the light barrier of which is provided by $TiO_2$. A low proportion can be directly absorbed by the outer skin of the preforms and the absence of ventilation does not allow sufficient diffusion of the temperature through the wall of the preforms before the outer skin has reached the melting temperature of the plastic material and degrades the wall of the preforms.

In particular, overheating of the preform then occurs, which causes bubbling, spherulitic crystallization and/or a granite appearance on the surface of the preform.

SUMMARY OF THE INVENTION

A particular aim of the invention is to address the disadvantages of the prior art.

More specifically, the aim of the invention is to propose an opaque preform, intended to contain milk, that is better adapted to the methods for manufacturing containers than the opaque preforms according to the prior art.

A further aim of the invention is to provide such a preform that allows the energy consumption associated with the production of containers from these preforms to be limited.

A further aim of the invention is to provide such a preform, as well as the corresponding container, that allows the container to be produced at a rate that is similar to that achieved for producing conventional transparent containers.

A still further aim of the invention is to provide such a preform that allows containers to be formed that are suitable for preserving milk and that can be heated, prior to forming, inside a laser oven.

These aims, as well as others that will become apparent hereafter, are achieved by virtue of the invention, the subject matter of which is a preform intended for forming containers by blow molding or stretch-blow molding, the preform being made of plastic material including at least one additive giving the plastic material the property of at least partially filtering the visible light spectrum, the preform comprising a wall forming a hollow body,
characterized in that said one or more additives give the plastic material the property of at least partially allowing the passage of light in the infrared spectrum, and in that the wall has, under electromagnetic radiation emitted perpendicular to the wall, transmittance:

in the visible spectrum, that is substantially equal to 0% within the wavelength range of 350 nm to 520 nm; and
in the infrared spectrum within a transmittance range extending between a threshold transmittance and an upper transmittance, for at least one wavelength within the range of 700 nm to 2250 nm, the threshold transmittance being equal to 5% and the upper transmittance being equal to 70%.

By virtue of the preforms according to the invention, it is possible to manufacture containers that are suitable for preserving milk, and at production rates that are likely to reach those obtained with preforms that are intended to manufacture conventional transparent containers.

More specifically, by virtue of the properties of the wall of the preforms, this preform heats more quickly than is allowed by the preforms according to the prior art, which include a high concentration of titanium dioxide in their composition, for example, 10% of $TiO_2$.

It has been noted that, with a transmittance threshold that is greater than or equal to 5%, it is possible to heat a preform according to the invention, where the opaque preform according to the prior art would be burnt, or would require a pause time between two heating operations in order to allow the temperature to diffuse through the wall of the preform.

Furthermore, it has also been surprisingly noted that, with an upper transmittance at 70% or below 70%, the temperature gradient within the wall of the preform was lower than expected. In particular, the phenomenon of overheating the outer skin in relation to the inner skin appears to be attenuated, with the calories of the heating radiation mainly being distributed when passing through the wall.

Indeed, by virtue of the transmittance within the claimed range, electromagnetic radiation, for at least one wavelength within the range of 700 nanometers to 2250 nanometers, allows the calories resulting from the heating to be distributed throughout the entire thickness of the wall of the preform.

Thus, even though it has a visible light "barrier" property in the spectrum of 350 nanometers to 520 nanometers, the preform can be heated in an oven at a speed that is higher than that achieved with the opaque preforms according to the prior art, and is capable of reaching the speed for heating conventional transparent preforms.

Furthermore, the preform according to the invention is able to be heated with a laser oven, which would be configured to emit electromagnetic heating radiation for the wavelength at which the preform has transmittance within the claimed range.

According to an advantageous feature, the transmittance in the infrared spectrum is within the transmittance range at wavelengths within the range of 750 nm to 1400 nm, and preferably within the range of 950 nm to 1400 nm.

By virtue of such transmittance in the infrared spectrum, the preform is particularly adapted to being heated in a halogen oven. Indeed, halogen ovens radiate most on these described ranges of wavelengths.

According to a preferred solution, the transmittance in the infrared spectrum is within the transmittance range for one wavelength or within a spectrum of wavelengths within one of the following ranges:

1110-1160 nm;
1390-1450 nm;
1610-1650 nm;
1675-1700 nm;
1880-2100 nm;
2170-2230 nm.

These wavelengths or these spectra of wavelengths correspond to spectra of wavelengths or of typical wavelengths of laser ovens.

In this case, advantageously, the transmittance in the infrared spectrum is within the transmittance range for a wavelength of 1130 nm.

Such transmittance in the infrared spectrum is particularly advantageous in that it allows optimal heating of the preform by means of a laser oven.

According to an advantageous feature, the threshold transmittance equals 8%, and preferably equals 10%.

By virtue of a transmittance threshold that is equal to 8%, the preform, which has, for example, a very thin wall, can be suitably heated.

With a transmittance threshold that is equal to 10%, the majority of the standard preforms can be suitably heated.

According to another advantageous feature, the upper transmittance equals 50%, and preferably equals 20%.

With a transmittance threshold that is equal to 50%, the adjustments of existing halogen ovens do not need to be adapted to allow correct heating of the preforms according to the invention.

In particular, the halogen ovens that are previously configured for conventional transparent preforms also can be used for the preforms according to the invention. In other words, the rate for producing a container from the preform according to the invention can reach that of conventional transparent preforms.

With transmittance that is equal to 20%, the preform can be optimally heated in an oven. More specifically, the heating radiation is then absorbed so that the inner skin of the wall tends to have a temperature that is closer to the temperature of the outer skin. This is particularly advantageous due to the fact that, between the inner skin and the outer skin, it is the inner skin of a preform that extends the most during forming.

According to an advantageous feature, the plastic material also includes at least one colorant.

Such a colorant advantageously can have a transmittance spectrum that varies along the spectrum. Of course, this colorant can have one or more higher transmittance spectral zones in the visible spectrum revealing a visible color. The colorant also can have spectral zones with lower transmittance, yet without cutting off the transmission of the radiation in the infrared spectrum.

Preferably, the thickness of the wall is within the range of 1 mm to 5 mm, and preferably within the range of 2 mm to 3.5 mm.

Advantageously, the preform is made of material comprising a PET matrix and additives.

Advantageously, the plastic material includes one or more additives forming a barrier against radiation below 350 nm.

According to a feature, the transmittance measured on a wall of the container for which said preform is intended is less than 5% in the wavelength range of 350 nm to 520 nm. This results in the transmittance of the wall of the preform in the visible spectrum being considered to be substantially equal to 0%.

Transmittance that is substantially equal to 0% particularly corresponds to a sensitivity limit of transmittance measurement hardware.

Indeed, the transmittance measured on a preform corresponds to a measurement on a wall with a thickness varying from 1 mm to 5 mm, whereas the transmittance measured on a container corresponds to a measurement carried out on a wall with a thickness that is approximately equal to 0.15 mm.

In this case, advantageously, the transmittance measured on a wall of said container, on completion of the stretch-blow molding of said preform, is less than 0.5%, in the wavelength range of 350 nm to 520 nm.

In this way, the light cannot degrade the riboflavin through the wall of the container formed from a preform according to the invention.

A further aim of the invention is a container made of plastic material formed by blow molding or stretch-blow molding a preform as described above, the container comprising a wall, characterized in that the wall of the container has, under electromagnetic radiation emitted perpendicular to said wall, transmittance, called container transmittance, of less than 5% in the wavelength range of 350 nm to 520 nm.

The container obtained from a preform according to the invention as previously described has container transmittance that allows good preservation of the milk that will be stored in the container.

More specifically, the wall of the container is then able to filter, in a particularly significant manner, the light spectrum that is capable of degrading the riboflavin.

In this case, preferably, the transmittance of the container is less than 0.5% within the wavelength range of 350 nm to 520 nm.

Such a container then filters more of the light spectrum within the range of wavelengths corresponding to the wavelengths capable of degrading the riboflavin.

The container is then particularly adapted to the preservation of milk.

A further aim of the invention is a method for manufacturing a container made of plastic material, successively comprising:

a step of heating a preform, involving emitting heating radiation toward the preform that is at least made up of electromagnetic radiation in an infrared spectrum for at least one wavelength within the range of 700 nm to 2250 nm;

a step of forming a container from the preform;

characterized in that it comprises, prior to the heating step, a step of manufacturing the preform made of plastic material including at least one additive giving the plastic material the properties for at least partially filtering the visible light spectrum, and of allowing at least partial passage of light in the infrared spectrum, wherein:

the preform comprises a wall forming a hollow body, said wall having, for the heating radiation and under electromagnetic radiation emitted perpendicular to said wall, transmittance within a transmittance range extending from 5% to 70%;

a wall of the container has, in the entire light spectrum within the range of 350 nm to 520 nm, transmittance of less than 5%, and preferably of less than 0.5%.

The method according to the invention allows a container to be obtained that is adapted for preserving milk with production rates that are much greater than is allowed by the prior art, and in particular production rates that can approach those of conventional transparent containers.

BRIEF DESCRIPTION OF THE DRAWINGS

Other features and advantages of the invention will become more clearly apparent on reading the following description of various embodiment, when taken in conjunction with the accompanying drawings.

DETAILED DESCRIPTION

Figure 1:
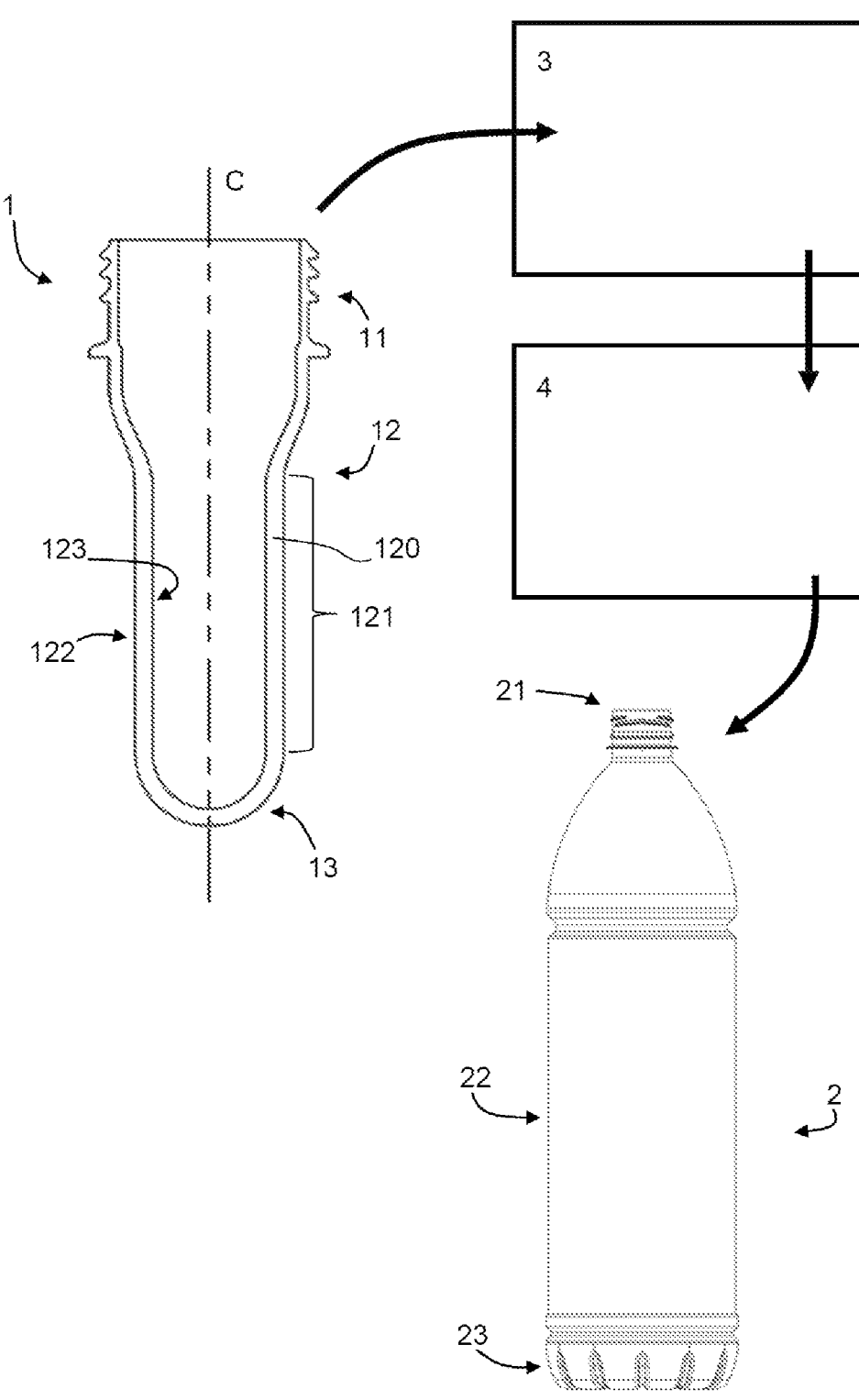
FIG. 1 is a schematic representation of a method for manufacturing a container from a preform, according to the invention.

With reference to FIG. 1, a method for manufacturing a container 2 made of plastic material according to the invention is shown.

This method, which is described in further detail hereafter, allows containers 2 to be manufactured from a preform 1 according to the invention by blow molding or stretch-blow molding.

The preform 1 comprises:

a neck 11;

a body 12;

a base 13.

The body 12 is rotationally symmetrical about a central axis C and has a rotationally cylindrical portion 121.

This body 12 is formed by a wall 120.

The thickness of the wall 120 is within the range of 1 mm to 5 mm, and preferably within the range of 2 mm to 3.5 mm.

This wall 120 has an outer skin 122 and an inner skin 123.

The base 13 is located at one of the ends of the body 12 and closes said body.

The neck 11 extends in the extension of the body 2, at another end of the body 12. This neck 11 is open and forms a lip for a final container 2 formed from the preform 1. The neck 11 has a final form that is intended to be preserved on the container 2 formed from the preform 1.

The preform is made of plastic material, for example, from polyethylene terephtalate (PET). In other words, the preform mainly includes PET.

For its part, the container 2 comprises:

a neck 21;

a body 22;

a base 23.

By way of analogy, the body 12 of the preform 1 becomes the body 22 of the container 2, the neck 11 of the preform 1 remains unchanged during the process of forming the container 2, and the base 13 of the preform 1 becomes the base 23 of the container 2.

In order to manufacture the container 2 from the preform 1, the method successively comprises:

a step of manufacturing the preform 1 made of plastic material;

a step of heating the preform 1;

a step of forming the container 2 from the preform 1.

With reference to FIG. 1, the heating step is carried out within a heating unit 3, and the forming step is carried out within a forming unit 4.

The heating step involves emitting heating radiation toward the preform. The purpose of this heating step is to heat the plastic material of the preform 1 until it exceeds its glass transition temperature, yet without reaching its spherulitic crystallization temperature.

As described hereafter, the heating step can be carried out either by an oven equipped with halogen lamps, called "halogen oven", or by an oven equipped with laser diodes, called "laser oven".

The forming step is carried out, in a known manner, either by blow molding or by stretch-blow molding.

According to the present embodiment, the plastic material of the preform 1 also includes at least one additive, denoted using the expression "additive partially forming a light barrier", giving the plastic material:

the property of at least partially filtering the visible light spectrum;

the property of at least partially allowing the passage of light in the infrared spectrum.

According to another contemplatable embodiment, the plastic material can include one or more additives forming a radiation barrier that is less than 350 nm, for example, additives that block UV radiation, in particular to the visible spectrum.

Such additives are known and described, for example, in the patent applications published under numbers WO 2019/133713 A1 and WO 2017/095931 A1.

The composition of the preform is produced so that the preform has transmittance exhibiting variations in the light spectrum.

More specifically, the transmittance is measured for the wall 120 of the body 12 of the preform 1.

More specifically, the transmittance is measured for the wall 120 at the cylindrical portion 121 of the body 12.

The transmittance, at a given point of the wall 120 under a given spectrum of electromagnetic radiation, is the ratio between the average weighted energy over the entire spectrum of radiation passing through said point of the given wall in all the emergence directions, divided by the weighted average over the entire spectrum of the incident radiation perpendicular to the wall.

The transmittance is measured as follows:

A Perkin Elmer Lambda 950 spectrophotometer is used. It comprises a 60 mm diameter integration sphere.

In order to ensure maximum stability and correct results, the following prerequisites must be followed during the installation of the measurement device:

a closed base not subject to vibrations;

a sufficient space around and below the appliance so that the air circulates properly;

a constant temperature ranging between 15° C. and 35° C.;

a constant relative humidity ranging between 20% and 80%;

an atmosphere free from dust and corrosive fumes;

the measurement device must be protected from sunlight; diffused lighting is recommended.

Prior preparation is required for measuring a preform 1. Indeed, the transmittance must be measured through a single wall 120 of the preform 1. To this end, the body thereof needs to be previously cut lengthwise, i.e. parallel to the axis C, using a saw or any other means that does not damage the surfaces of the sample, so as to keep only one half.

The preform 1 must be properly held against the transmittance port. For this reason, tooling needs to be added that is installed in front of the transmittance port in order to keep the preform centered on the port and so that its axis of rotation is aligned with the widest side of the beam of the source in order to minimize the form effect associated with the curvature.

Figure 2:
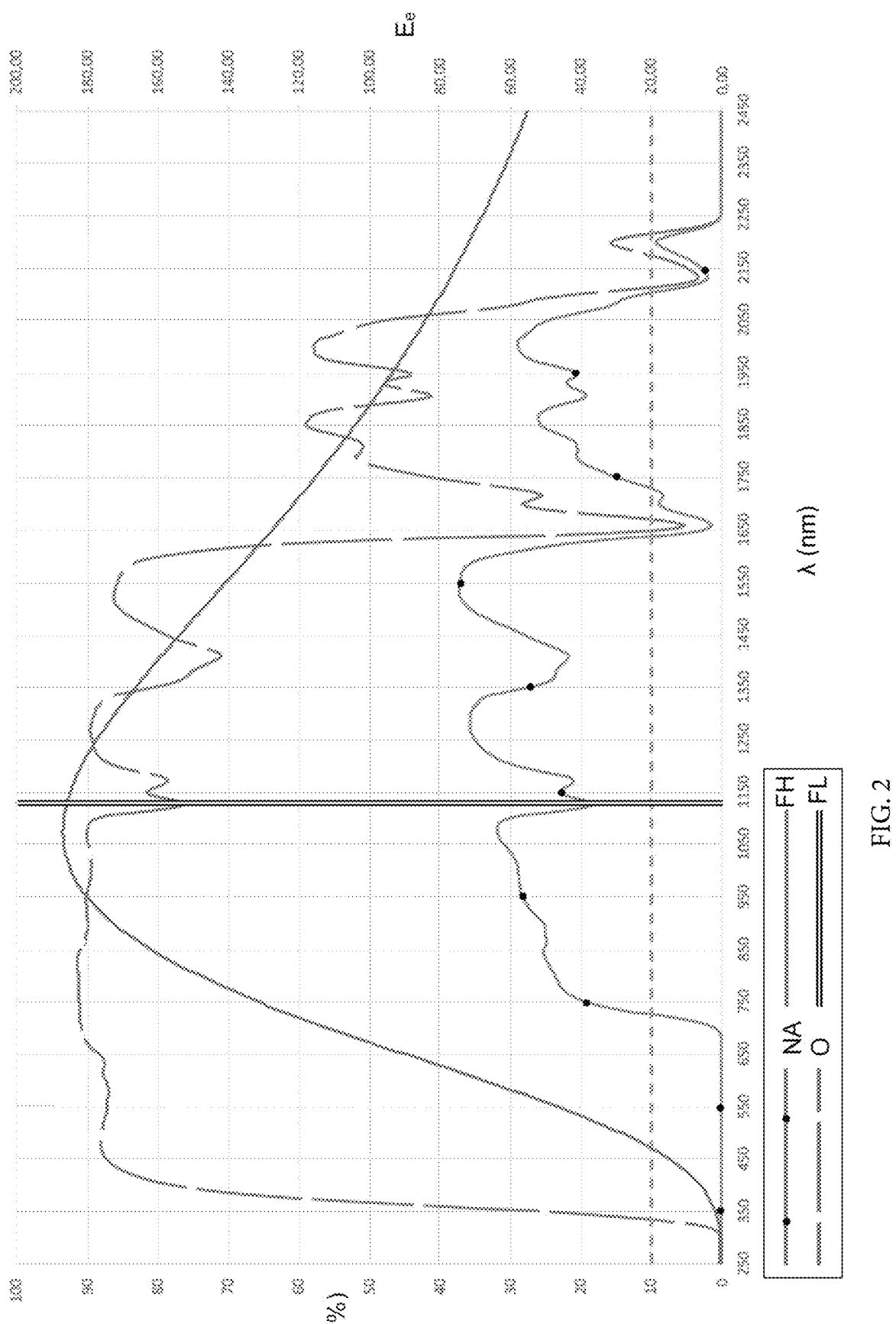
FIG. 2 is a graph illustrating the transmittance of a preform according to the invention, and the transmittance of a conventional transparent preform, connected with the irradiance of a halogen oven and of a laser oven.

FIG. 2 shows the evolution of the transmittance T as a function of the wavelength $\lambda$ of the light spectrum, for:

a conventional transparent preform according to the prior art, by means of the curve "O";

a preform according to the invention, by means of the curve "NA".

FIG. 2 also adds to the aforementioned curves the curves of irradiance $E_e$ as a function of the wavelength $\lambda$ for a halogen oven "HO" and for a laser oven "LO".

As can be seen in FIG. 2, a conventional transparent preform has transmittance that is greater than 20% at 350 nm, and on average that is greater than 80% from 450 nm to 1550 nm.

This type of preform produces containers 2 that are not adapted to the preservation of all types of products.

For example, this type of preform does not allow containers to be produced that are adapted to the preservation of milk, due to the fact that the containers subsequently allow light to pass through their wall in the visible spectrum, and particularly from 350 nm to 520 nm.

According to the principle of the invention, and as can be seen in FIG. 2, the wall 120 of the preform 1 has, under electromagnetic radiation emitted perpendicular to the wall 120, transmittance:

in the visible spectrum, that is substantially equal to 0% within the wavelength range of 350 nm to 520 nm;

in the infrared spectrum, within a transmittance range extending between a threshold transmittance and an upper transmittance, for at least one wavelength within the range of 700 nm to 2250 nm.

Substantially equal to 0% is understood to mean that, according to the measurement protocol, the measured transmittance reaches the detection threshold of the measurement device used in this protocol. This transmittance is particularly equal to a rounded value of 0%.

As explained hereafter, this transmittance of the preform 1 in the visible spectrum allows the container 2 to have an ability to avoid the degradation of the riboflavin of the milk that will be stored in the container 2.

The threshold transmittance is equal to 5%, preferably to 8% and even more preferably to 10%.

Based on a threshold transmittance of 5%, the tests have demonstrated the possibility of heating a preform 1 at a satisfactory speed, and particularly for preforms with walls that are considered to be "very thin" (i.e. as approximately being 1 mm to 1.5 mm thick).

Indeed, with this transmittance threshold sufficient light power is able to pass through the wall 120 of the preform 1 and the absorption of this through-radiation is sufficiently distributed through the thickness of the wall 120. This thus results in a sufficiently even increase in temperature in the thickness of the wall 120, with this occurring from the first passage of the radiation from the outside to the inside of the wall 120.

From a threshold transmittance of 8%, the tests have demonstrated the possibility of heating a preform 1 quickly enough that has a wall 120 that is considered to be "thin" (i.e. as approximately 1.5 mm to 2 mm thick).

Finally, with a threshold transmittance of 10%, any preform 1 according to the invention that is more than 2 mm thick can be heated at a speed that is substantially comparable to that of the conventional transparent preforms.

The upper transmittance is, for its part, equal to 70%, preferably to 50% and even more preferably to 20%.

It has been noted by the means of tests that an upper transmittance that is equal to 70% avoids the preform 1 being "excessively" transparent to the electromagnetic radiation used for heating.

With the preforms 1 being hollow bodies, the homogeneity of the heating in the thickness of their wall is also due, in the case of highly radiation transparent preforms, to a passage from the outside to the inside of their wall, then from the inside to the outside, then optionally by virtue of reflectors, by several outside-inside-outside passages.

With the upper transmittance equal to 70%, the homogeneity of the heating in the thickness of the thick wall of the preform is obtained with a limited number of complete outside-inside-outside passages.

This reduces the energy loss of the oven in the reflectors, and accelerates the heating of the preform.

By virtue of an upper transmittance that is equal to 50%, it is possible to heat the preform 1 in a halogen oven whilst ensuring sufficient heating above the glass transition temperature of the inner skin 123 of the preform 1, without burning the outer skin 122.

Finally, the upper transmittance that is equal to 20% provides a particularly advantageous compromise in that it allows better heating rates to be achieved for the preforms 1.

By way of a reminder, in order to obtain the container 2 according to the invention from the preform 1 according to the invention, the step of heating the container involves emitting heating radiation toward the preform.

This heating radiation is made up of at least electromagnetic radiation in an infrared spectrum with at least one wavelength within the range extending from 700 nm to 2250 nm. This one or these wavelength(s) of the heating radiation correspond(s) to the one or more wavelength(s) for which the wall 120 of the preform 1 has transmittance within the transmittance range extending between the threshold transmittance and the upper transmittance.

With transmittance in the infrared spectrum in one of the aforementioned ranges, the preform 1 is eligible for laser heating. This laser heating is then carried out at one or more wavelengths within the range extending from 700 nm to 2250 nm, for which the one or more preforms 1 has suitable transmittance.

In order to optimize heating the preform 1 in a laser oven, the transmittance of the wall 120 in the infrared spectrum can be within the transmittance range for a wavelength or within a spectrum of wavelengths included in one of the following ranges:

1110-1160 nm;

1390-1450 nm;

1610-1650 nm;

1675-1700 nm;

1880-2100 nm;

2170-2230 nm.

These ranges of wavelengths or of spectra of wavelengths represent typical heating that is carried out with a laser oven.

With reference to FIG. 2, and according to a preferred embodiment of the preform 1, in order for said preform to be heated in a laser oven, then the transmittance in the infrared spectrum is within the transmittance range for a wavelength of 1130 nm. It is understood that the preform 1 then has a narrow wavelength spectrum encompassing the wavelength of 1130 nm.

In this case, the heating step of the method is carried out with a laser oven that produces heating radiation at 1130 nm. As previously stated, the preform 1 according to the invention also can be heated in a halogen oven.

In order to optimize heating the preform 1 in a halogen oven, the transmittance of the wall 120 in the infrared spectrum then can be within the transmittance range, for wavelengths within the range of 750 nm to 1400 nm, and preferably within the range of 950 nm to 1400 nm.

As illustrated in FIG. 2, these ranges of wavelengths correspond to those where a halogen oven has greater average irradiance. By virtue of the preform 1 according to the invention, a container 2 according to the invention can be obtained.

This container 2 has precise features that are derived from those of the preforms 1. More specifically, the wall of the container 2 has, under electromagnetic radiation emitted perpendicular to said wall, transmittance, called container transmittance, that is less than 5%, preferably less than 0.5%, within the wavelength range of 350 nm to 520 nm.

With transmittance of less than 5%, the container 2, which is used to contain milk, thus allows the degradation of the riboflavin of this milk to be minimized.

With transmittance of less than 0.5%, the container 2 prevents the degradation of the riboflavin by light radiation over the wavelength range of 350 to 520 nm.

According to an advantageous embodiment, the plastic material of the preform 1 also includes a colorant. Such a colorant advantageously can have transmittance that varies along the light spectrum.

However, the selected colorant does not have a cut-off wavelength (by which said plastic equipped with said colorant forms a barrier) in the infrared spectrum, but can have zero transmittance outside the infrared range.

The invention claimed is:

1. An opaque preform intended for forming containers by blow molding or stretch-blow molding, the preform comprising:

a hollow body being made of a plastic material including at least one additive giving the plastic material the property of at least partially filtering the visible light spectrum, the hollow body comprising a wall comprising a thickness of about 1 mm to about 5 mm that is between about 4-50 times greater than a thickness of a wall of the container that is formed from the preform, characterized in that said one or more additive(s) give the plastic material the property of at least partially allowing the passage of light in the infrared spectrum, and in that the preform wall has, under electromagnetic radiation emitted perpendicular to the preform wall, transmittance in the visible spectrum, that is substantially equal to 0% in the wavelength range of 350 nm to 520 nm; and transmittance in the infrared spectrum within a transmittance range extending between a threshold transmittance and an upper transmittance, for at least one wavelength within the range of 700 nm to 2250 nm, the threshold transmittance being equal to 5% and the upper transmittance being equal to 70%.

2. The preform as claimed in claim 1, wherein the transmittance in the infrared spectrum is within the transmittance range for a wavelength of 1130 nm.

3. The preform as claimed in claim 1, wherein the threshold transmittance equals 8%.

4. The preform as claimed in claim 1, wherein the upper transmittance equals 50%.

5. The preform as claimed in claim 1, wherein the plastic material also comprises at least one colorant.

6. The preform as claimed in claim 1, wherein the thickness of the wall of the hollow body is within the range of 1 mm to 2 mm.

7. The preform as claimed in claim 1, wherein the plastic material comprises one or more additives forming a barrier against radiation below 350 nm.

8. The preform as claimed in claim 1, wherein the transmittance in the infrared spectrum is within the transmittance range at wavelengths within the range of 950 nm to 1400 nm.

9. The preform as claimed in claim 1, wherein the threshold transmittance equals 10%.

10. The preform as claimed in claim 1, wherein the upper transmittance equals 20%.

11. The preform as claimed in claim 1, wherein the transmittance in the infrared spectrum is within the transmittance range at wavelengths within the range of 750 nm to 1400 nm.

12. The preform as claimed in claim 11, wherein the transmittance in the infrared spectrum is within the transmittance range for a wavelength of 1130 nm.

13. The preform as claimed in claim 11, wherein the threshold transmittance equals 8%.

14. The preform as claimed in claim 11, wherein the upper transmittance equals 50%.

15. The preform as claimed in claim 1, wherein the transmittance in the infrared spectrum is within the transmittance range for one wavelength or within a spectrum of wavelengths within one of the following ranges:

1110-1160 nm;
1390-1450 nm;
1610-1650 nm;
1675-1700 nm;
1880-2100 nm; and
2170-2230 nm.

16. The preform as claimed in claim 15, wherein the transmittance in the infrared spectrum is within the transmittance range for a wavelength of 1130 nm.

17. The preform as claimed in claim 15, wherein the threshold transmittance equals 8%.

18. The preform as claimed in claim 15, wherein the upper transmittance equals 50%.

19. The preform as claimed in claim 1, wherein the transmittance measured on a wall of the container for which said preform is intended is less than 5% within the wavelength range of 350 nm to 520 nm, whereby the transmittance of the wall of the preform in the visible spectrum is considered to be substantially equal to 0%.

20. The preform as claimed in claim 19, wherein the transmittance measured on a wall of said container is less than 0.5%, within the wavelength range of 350 nm to 520 nm.

21. An opaque preform intended for forming containers by blow molding or stretch-blow molding, the preform comprising:

a hollow body formed from plastic material comprising at least one additive giving the plastic material the property of at least partially filtering the visible light spectrum, the preform comprising a wall forming the hollow body, the preform wall comprising a first thickness of about 1 mm to about 5 mm that is greater than a second thickness of a wall of the container, wherein one or more additive(s) give the plastic material the property of at least partially allowing the passage of light in the infrared spectrum, and in that the preform wall has, under electromagnetic radiation emitted perpendicular to the preform wall, transmittance in the visible spectrum that is substantially equal to 0% in the wavelength range of 350 nm to 520 nm, and transmittance in the infrared spectrum within a transmittance range extending between a threshold transmittance and an upper transmittance, for at least one wavelength within the range of 700 nm to 2250 nm, the threshold transmittance being equal to 5% and the upper transmittance being equal to 70%.

22. An opaque preform for protecting the degradation of milk's riboflavin, the preform intended for forming containers by blow molding or stretch-blow molding, and further being filled with milk comprising the riboflavin, the preform comprising:

a hollow body formed from plastic material comprising at least one additive giving the plastic material the property of at least partially filtering the visible light spectrum, the preform comprising a wall forming the hollow body and defining a preform wall thickness of about 1 mm to about 5 mm, the container that is formed by the preform comprising a container wall thickness, wherein the preform wall thickness is greater than the container wall thickness, wherein one or more additive(s) give the plastic material the property of at least partially allowing the passage of light in the infrared spectrum, and in that the preform wall has, under electromagnetic radiation emitted perpendicular to the preform wall, transmittance in the visible spectrum that is substantially equal to 0% in the wavelength range of 350 nm to 520 nm, and transmittance in the infrared spectrum within a transmittance range extending between a threshold transmittance and an upper transmittance, for at least one wavelength within the range of 700 nm to 2250 nm, the threshold transmittance being equal to 5% and the upper transmittance being equal to 70%.

\*    \*    \*    \*    \*